(12) United States Patent
Zhang et al.

(10) Patent No.: US 12,490,175 B2
(45) Date of Patent: Dec. 2, 2025

(54) TERMINAL DEVICE, NETWORK NODE AND METHODS THEREIN FOR HANDLING SYSTEM INFORMATION

(71) Applicant: Telefonaktiebolaget LM Ericsson (publ), Stockholm (SE)

(72) Inventors: Zhang Zhang, Beijing (CN); Antonino Orsino, Kirkkonummi (FI); Congchi Zhang, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 403 days.

(21) Appl. No.: 18/018,686

(22) PCT Filed: Jun. 30, 2021

(86) PCT No.: PCT/CN2021/103584
§ 371 (c)(1),
(2) Date: Jan. 30, 2023

(87) PCT Pub. No.: WO2022/022208
PCT Pub. Date: Feb. 3, 2022

(65) Prior Publication Data
US 2023/0308991 A1    Sep. 28, 2023

(30) Foreign Application Priority Data

Jul. 30, 2020   (WO) ................ PCT/CN2020/105903

(51) Int. Cl.
*H04W 48/14*   (2009.01)
*H04W 76/14*   (2018.01)
*H04W 88/04*   (2009.01)

(52) U.S. Cl.
CPC ........... *H04W 48/14* (2013.01); *H04W 76/14* (2018.02); *H04W 88/04* (2013.01)

(58) Field of Classification Search
CPC ....... H04W 64/00; H04W 8/22; H04W 92/18; H04W 24/10; H04W 72/25; H04W 28/0205
See application file for complete search history.

(56) References Cited

U.S. PATENT DOCUMENTS

| | | | |
|---|---|---|---|
| 2018/0020442 | A1 | 1/2018 | Nair |
| 2018/0092027 | A1 | 3/2018 | Sheng |

(Continued)

FOREIGN PATENT DOCUMENTS

| | | |
|---|---|---|
| CN | 110945936 A | 3/2020 |
| CN | 111182655 A | 5/2020 |
| CN | 111356234 A | 6/2020 |

OTHER PUBLICATIONS

Extended European Search Report for European Patent Application No. 21850299.5, mailed Jul. 23, 2024, 12 pages.

(Continued)

*Primary Examiner* — Iqbal Zaidi
(74) *Attorney, Agent, or Firm* — Withrow & Terranova, PLLC

(57) ABSTRACT

The present disclosure provides a method in a first terminal device. The method includes: receiving, from a second terminal device serving as a relay between the first terminal device and a network node, system information related to sidelink communication between the first terminal device and the second terminal device.

15 Claims, 9 Drawing Sheets

Receive, from a second terminal device serving as a relay between the first terminal device and a network node, system information related to sidelink communication between the first terminal device and the second terminal device. — 310

— 300

Transmit, to the first terminal device, system information related to sidelink communication between the first terminal device and the second terminal device. — 410

— 400

(56) References Cited

U.S. PATENT DOCUMENTS

| | | | |
|---|---|---|---|
| 2018/0139798 A1* | 5/2018 | Jung | H04W 76/27 |
| 2020/0029299 A1 | 1/2020 | Kuang et al. | |
| 2020/0091991 A1 | 3/2020 | Fujishiro et al. | |
| 2023/0200855 A1* | 6/2023 | Treace | A61B 17/6425 |
| | | | 606/57 |
| 2025/0063534 A1* | 2/2025 | Barbu | H04W 64/00 |

OTHER PUBLICATIONS

Author Unknown, "Technical Specification Group Radio Access Network; NR; NR and NG-RAN Overall Description; Stage 2 (Release 16)," Technical Specification 38.300, Version 16.2.0, Jul. 2020, 3GPP Organizational Partners, 148 pages.

Author Unknown, "Technical Specification Group Radio Access Network; NR; Radio Resource Control (RRC) protocol specification (Release 16)," Technical Specification 38.331, Version 16.1.0, Jul. 2020, 3GPP Organizational Partners, 906 pages.

International Search Report and Written Opinion for International Patent Application No. PCT/CN2021/103584, mailed Sep. 28, 2021, 9 pages.

\* cited by examiner

First Terminal
Device 600

First Terminal
Device 700

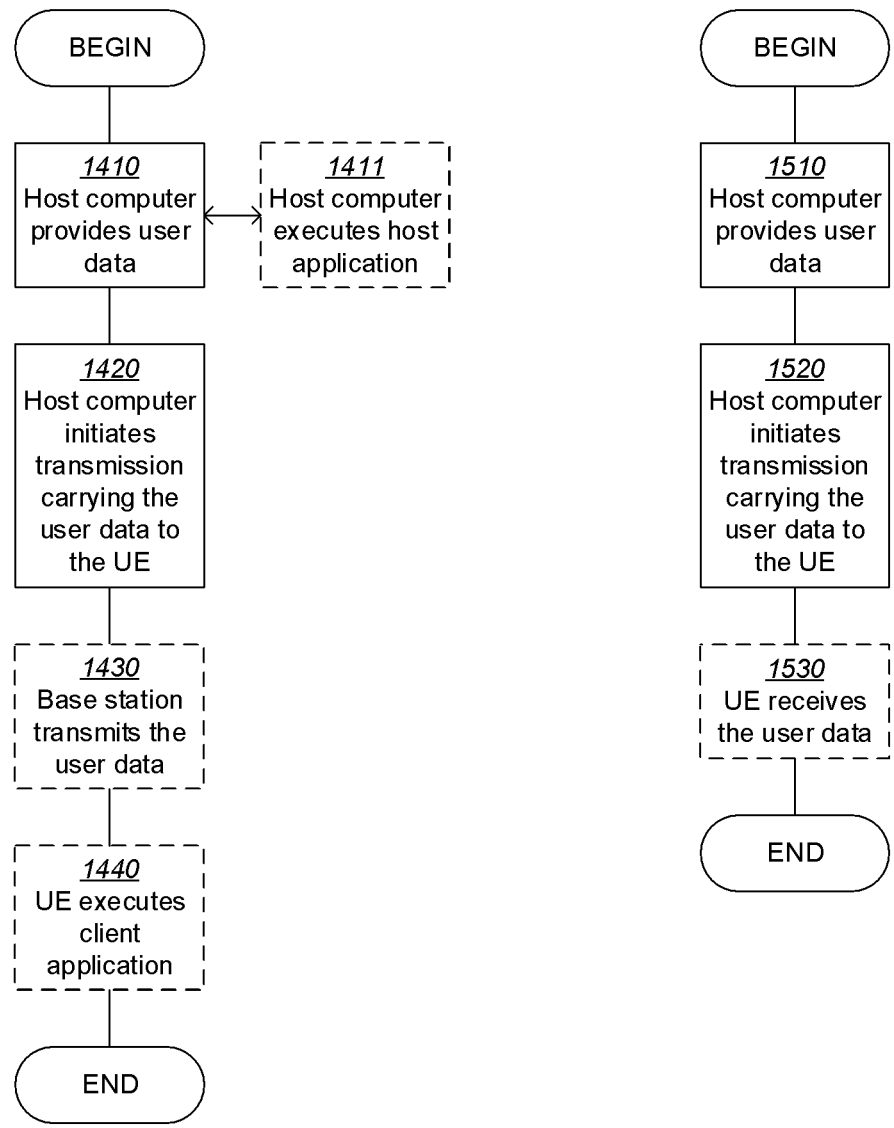

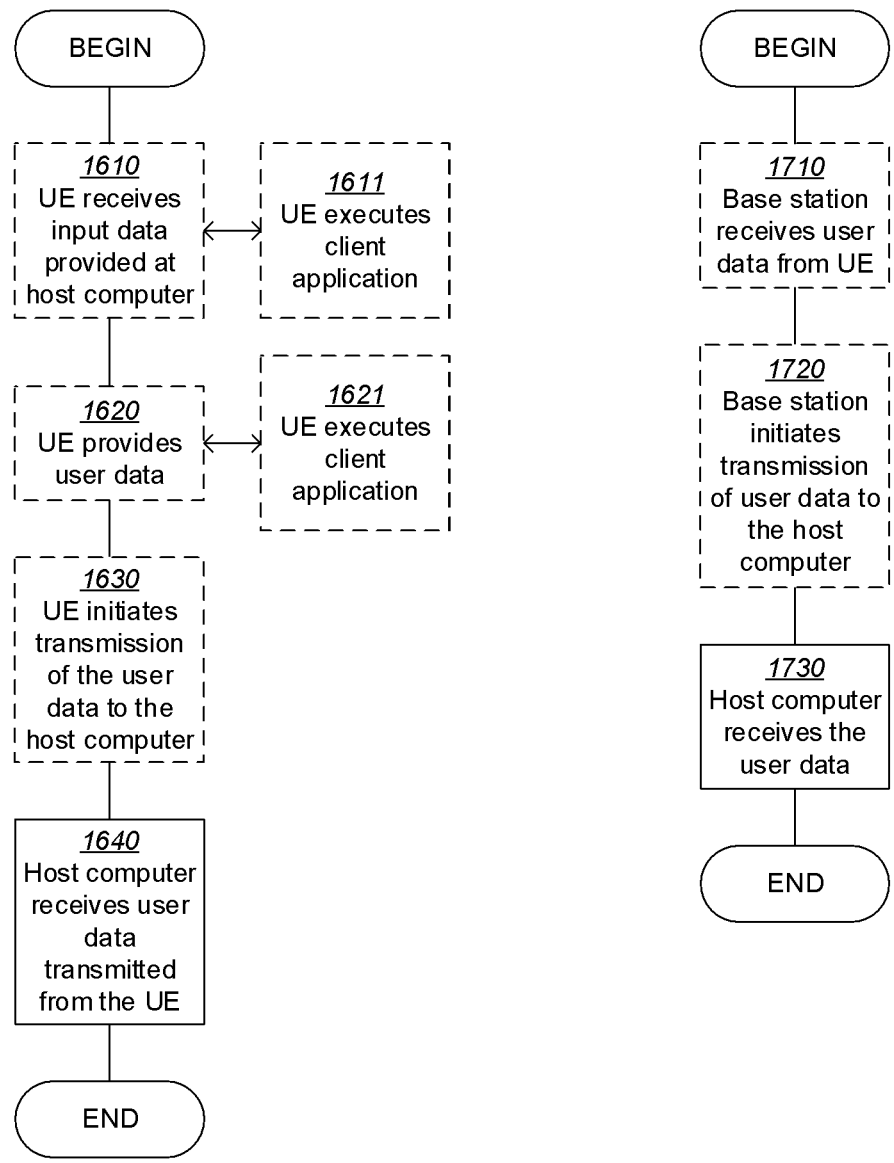

TERMINAL DEVICE, NETWORK NODE AND METHODS THEREIN FOR HANDLING SYSTEM INFORMATION

This application is a 35 U.S.C. § 371 national phase filing of International Application No. PCT/CN2021/103584, filed Jun. 30, 2021, which claims the benefit of International Application No. PCT/CN2020/105903, filed Jul. 30, 2020, the disclosures of which are incorporated herein by reference in their entireties.

TECHNICAL FIELD

The present disclosure relates to communication technology, and more particularly, to terminal devices, a network node, and methods therein for handling system information.

BACKGROUND

According to the 3$^{rd}$ Generation Partnership Project (3GPP) Technical Specification (TS) 38.300, V16.2.0, which is incorporated herein by reference in its entirety, System Information (SI) consists of a Master Information Block (MIB) and a number of System Information Blocks (SIBs), which are divided into Minimum SI and Other SI:

Minimum SI comprises basic information required for initial access and information for acquiring any other SI. Minimum SI consists of:
  MIB contains cell barred status information and essential physical layer information of the cell required to receive further system information, e.g. Control Resource Set (CORESET) #0 configuration. MIB is periodically broadcast on Broadcast Channel (BCH).
  SIB1 defines the scheduling of other system information blocks and contains information required for initial access. SIB1 is also referred to as Remaining Minimum SI (RMSI) and is periodically broadcast on Downlink Shared Channel (DL-SCH) or sent in a dedicated manner on DL-SCH to User Equipments (UEs) in Radio Resource Control (RRC)_CONNECTED.
Other SI encompasses all SIBs not broadcast in the Minimum SI. Those SIBs can either be periodically broadcast on DL-SCH, broadcast on-demand on DL-SCH (i.e. upon request from UEs in RRC_IDLE or RRC_INACTIVE), or RRC_CONNECTED, or sent in a dedicated manner on DL-SCH to UEs in RRC_CONNECTED (i.e., upon request from UEs in RRC_CONNECTED or when the UE has an active Bandwidth Part (BWP) with no common search space configured). Other SI consists of:
  SIB2 contains cell re-selection information, mainly related to the serving cell;
  SIB3 contains information about the serving frequency and intra-frequency neighbouring cells relevant for cell re-selection (including cell re-selection parameters common for a frequency as well as cell specific re-selection parameters);
  SIB4 contains information about other New Radio (NR) frequencies and inter-frequency neighbouring cells relevant for cell re-selection (including cell re-selection parameters common for a frequency as well as cell specific re-selection parameters);
  SIB5 contains information about Evolved-Universal Terrestrial Radio Access (E-UTRA) frequencies and E-UTRA neighbouring cells relevant for cell re-selection (including cell re-selection parameters common for a frequency as well as cell specific re-selection parameters);
  SIB6 contains an Earthquake and Tsunami Warning System (ETWS) primary notification;
  SIB7 contains an ETWS secondary notification;
  SIB8 contains a Commercial Mobile Alert System (CMAS) warning notification;
  SIB9 contains information related to Global Positioning System (GPS) time and Coordinated Universal Time (UTC).
For sidelink, Other SI also includes:
SIB12 contains information related to NR sidelink communication;
SIB13 contains information related to SystemInformationBlockType21 for Vehicle-to-Everything (V2X) sidelink communication;
SIB14 contains information related to SystemInformationBlockType26 for V2X sidelink communication.

According to 3GPP TS 38.331, V16.1.0, which is incorporated herein by reference in its entirety, System Information (SI) is divided into the MIB and a number of SIBs and Positioning SIBs (posSIBs) where:
  the MIB is always transmitted on the BCH with a periodicity of 80 ms and repetitions made within 80 ms and it includes parameters that are needed to acquire SIB1 from the cell. The first transmission of the MIB is scheduled in subframes and repetitions are scheduled according to the period of Synchronization Signal Block (SSB);
  the SIB1 is transmitted on the DL-SCH with a periodicity of 160 ms and variable transmission repetition periodicity within 160 ms. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern 2/3, SIB1 transmission repetition period is the same as the SSB period. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;
  SIBs other than SIB1 and posSIBs are carried in SystemInformation (SI) messages, which are transmitted on the DL-SCH. Only SIBs or posSIBs having the same periodicity can be mapped to the same SI message. SIBs and posSIBs are mapped to the different SI messages. Each SI message is transmitted within periodically occurring time domain windows (referred to as SI-windows with same length for all SI messages). Each SI message is associated with an SI-window and the SI-windows of different SI messages do not overlap. That is, within one SI-window only the corresponding SI message is transmitted. An SI message may be transmitted a number of times within the SI-window. Any SIB or posSIB except SIB1 can be configured to be cell specific or area specific, using an indication in SIB1. The cell specific SIB is applicable only within a cell that provides the SIB while the area specific SIB is applicable within an area referred to as SI area, which consists of one or several cells and is identified by systemInformationAreaID;

The mapping of SIBs to SI messages is configured in schedulingInfoList, while the mapping of posSIBs to SI messages is configured in posSI-SchedulingInfoList;

For a UE in RRC_CONNECTED, the network can provide system information through dedicated signalling using the RRCReconfiguration message, e.g. if the UE has an active BWP with no common search space configured to monitor system information or paging.

SUMMARY

A UE shall apply an SI acquisition procedure upon cell selection (e.g. upon power on), cell-reselection, return from out of coverage, after reconfiguration with sync completion, after entering the network from another Radio Access Technology (RAT), upon receiving an indication that the system information has changed, upon receiving a Public Warning System (PWS) notification, upon receiving a positioning request from upper layers; and whenever the UE does not have a valid version of a stored SIB. When the UE acquires a MIB or a SIB1 or an SI message in a serving cell, and if the UE stores the acquired SIB, then the UE shall store, among others, the valueTag, if present, as indicated in the si-SchedulingInfo for the SIB. The UE may use a valid stored version of the SI except MIB, SIB1, SIB6, SIB7 or SIB8 e.g. after cell re-selection, upon return from out of coverage or after the reception of SI change indication. The value tag for posSIB is optionally provided in Long Term Evolution (LTE) Positioning Protocol (LPP) signaling.

A modification period is used, i.e. updated SI message (other than SI message for ETWS, CMAS and positioning assistance data) is broadcasted in the modification period following the one where SI change indication is transmitted. The modification period boundaries are defined by System Frame Number (SFN) values for which SFN mod m=0, where m is the number of radio frames comprising the modification period. The modification period is configured by system information. The UE receives indications about SI modifications and/or PWS notifications using Short Message transmitted with Paging-Radio Network Temporary Identity (P-RNTI) over Downlink Control Information (DCI). Repetitions of SI change indication may occur within preceding modification period. The SI change indication is not applicable for SI messages containing posSIBs.

UEs in RRC_IDLE or in RRC_INACTIVE shall monitor for SI change indication in its own paging occasion every Discontinuous Reception (DRX) cycle. UEs in RRC_CONNECTED shall monitor for SI change indication in any paging occasion at least once per modification period if the UE is provided with common search space on the active BWP to monitor paging. ETWS or CMAS capable UEs in RRC_IDLE or in RRC_INACTIVE shall monitor for indications about PWS notification in its own paging occasion every DRX cycle. ETWS or CMAS capable UEs in RRC_CONNECTED shall monitor for indication about PWS notification in any paging occasion at least once every defaultPagingCycle if the UE is provided with common search space on the active BWP to monitor paging. For Short Message reception in a paging occasion, the UE monitors the Physical Downlink Control Channel (PDCCH) monitoring occasion(s) for paging.

On-demand system information request is a feature in NR that allows the network to only broadcast some of the system information messages when there is a UE that needs to acquire it. The UE then requests such SI messages using either Message 1 (Msg1) or Message 3 (Msg3) based procedures. The procedure allows a UE to request the needed content on demand and allows the network to minimize the overhead in constantly broadcasting information that no UE is currently acquiring. Further, some of the System Information messages can be provided to the UE also in dedicated state using the RRC Connection Reconfiguration message.

For the RRC On-demand SI framework, the parameter si-BroadcastStatus is used to indicate if an SI message is currently being broadcasted or not.

si-BroadcastStatus ENUMERATED {broadcasting, notBroadcasting}

From the UE's perspective, independently of whether an SI message is indicated as broadcasting or notBroadcasting, the UE obtains the SI scheduling information for the SI message from SIB1. If the SI message is indicated as broadcasting the UE can then directly acquire the SI message based on the SI scheduling information. However, if the SI message is indicated as notBroadcasting, the UE first needs to perform the on-demand SI request procedure to the base station in order to initiate the transmission of the SI message (according to the SI scheduling information).

Currently, the on-demand broadcast for UEs in RRC_IDLE/INACTIVE is based on the following Msg1 and Msg3 solutions:

Broadcast (Msg1 option):
   Msg1 SI Request Random Access Channel (RACH) procedure (Physical Random Access Channel (PRACH), Random Access Response (RAR))
   Broadcast SI message (for some time)

Broadcast (Msg3 option):
   Msg3 SI Request RACH procedure (PRACH, RAR, RRCSystemInfoRequest, "Msg4")
   Broadcast SI message (for some time)

Further, in 3GPP, the following unicast (dedicated signaling) from idle/inactive is also currently being discussed.

Unicast (from IDLE/INACTIVE):
   Full RACH procedure (PRACH, RAR, RRC Setup/Resume Request, RRC Setup/Resume)
   On demand request message
   Dedicated SI message For UEs in RRC_CONNECTED, SIBs can be requested on-demand and the granularity is per SIB. In order to do so, a UE can send the DedicatedSIBRequest message with the requested SIBs and the network may choose to broadcast them or to send them via dedicated signaling in the RRC reconfiguration message.

For further details regarding the SI/SIB handling in the NR/LTE, reference can be made to 3GPP TS 38.300, V16.2.0 and TS 38.331, V16.1.0.

FIG. 1 shows an application environment of a Cellular-Intelligent Transport System (C-ITS). C-ITS aims at defining a new cellular eco-system for the delivery of vehicular services and their dissemination. Such eco-system includes both short range and long range V2X service transmissions, as shown. In particular, short range communication involves transmissions over the Device-to-Device (D2D) link, also defined as sidelink or PC5 interface in 3GPP, towards other vehicular UEs or Road Side Units (RSUs). On the other hand, long range transmission involves the transmission over the Uu interface between a UE and a base station, in which case packets may be disseminated to different ITS service providers, which could be road traffic authorities, road operators, automotive Original Equipment Manufacturers (OEMs), cellular operators, etc.

When it comes to the sidelink interface, the first standardization effort in 3GPP dates back to Rel-12, targeting public safety use cases. Since then, a number of enhancements have been introduced with the objective to enlarge the use cases that could benefit of the D2D technology. Particularly, in LTE Rel-14 and Rel-15, the extensions for the D2D work consists of supporting V2X communication, including any combination of direct communication between vehicles (V2V), pedestrians (V2P) and infrastructure (V2I).

FIG. 2 shows an exemplary sidelink relay scenario, where a UE 220 (referred to as Relay (RL) UE) can communicate directly with a network node 210 via a Uu interface, whereas a UE 222 (referred to as Remote (RM) UE) cannot communicate directly with the network node 210, e.g., when it is out of coverage of the network node 210. In this scenario, the RL UE 220 may communicate with the RM UE 222 over sidelink (PC5 interface) and serve as a relay between the network node 210 and the RM UE 222.

In the scenario shown in FIG. 2, the RM UE 222 may not be able to acquire SIBs from the network, as the SIBs are typically broadcasted by the network node 210. Since the SIBs carry important information for establishing and/or maintaining sidelink connectivity, without acquiring the SIBs, the RM UE 222 will not be able to establish the sidelink communication or to transmit/receive data to/from the network node 210 (via the RL UE 220).

It is an object of the present disclosure to provide terminal devices, a network node, and methods therein, capable of enabling a terminal device that is not able to communicate with a network node directly (e.g., when it is out-of-coverage)_ to acquire required system information.

According to a first aspect of the present disclosure, a method in a first terminal device is provided. The method includes: receiving, from a second terminal device serving as a relay between the first terminal device and a network node, system information related to sidelink communication between the first terminal device and the second terminal device.

In an embodiment, the method may further include: transmitting, to the second terminal device, a request message. The system information may be received as a response to the request message.

In an embodiment, the request message may include a request for establishing the sidelink communication.

In an embodiment, the request message may contain an indication of the system information required by the first terminal device.

In an embodiment, the request message may include an on-demand request for the system information.

In an embodiment, the system information may be received via PC5-Signaling, (PC5-S) or PC5-Radio Resource Control (RRC) signaling.

In an embodiment, the system information may be received in a Uu RRC message or a container originated from the network node and forwarded by the second terminal device.

In an embodiment, the method may further include: transmitting, to the second terminal device, a Uu RRC message destined to the network node and containing an on-demand request for the system information.

In an embodiment, the on-demand request may be triggered when one or more of the following conditions are met:
the first terminal device does not have the system information required for establishing the sidelink communication,
the system information stored at the first terminal device becomes invalid,
an update of the system information is available,
the first terminal device switches from communication with the network node relayed by a third terminal device to communication with the network node relayed by the second terminal device,
the first terminal device switches from direct communication with the network node to communication with the network node relayed by the second terminal device, or
the first terminal device switches from communication with another network node to communication with the network node.

In an embodiment, the system information may include one or more SIBs, or one or more information fields of the SIBs, related to the sidelink communication.

According to a second aspect of the present disclosure, a method in a second terminal device serving as a relay between a first terminal device and a network node is provided. The method includes: transmitting, to the first terminal device, system information related to sidelink communication between the first terminal device and the second terminal device.

In an embodiment, the method may further include: receiving, from the first terminal device, a request message. The system information may be transmitted in response to the request message.

In an embodiment, the request message may be a request for establishing the sidelink communication.

In an embodiment, the request message may contain an indication of the system information required by the first terminal device.

In an embodiment, the request message may include an on-demand request for the system information.

In an embodiment, the method may further include: acquiring the system information from the network node when the system information is not locally stored at the second terminal device.

In an embodiment, the operation of acquiring may include: listening to a broadcast channel for the system information, or transmitting an on-demand request for the system information to the network node and receiving from the network node the system information as a response to the on-demand request.

In an embodiment, the method may further include: acquiring the system information from the network node periodically or in response to an update of the system information.

In an embodiment, the system information may be transmitted via PC5-S or PC5-RRC signaling.

In an embodiment, the system information may be transmitted in a Uu RRC message or a container originated from the network node and destined to the first terminal device.

In an embodiment, the method may further include: receiving, from the first terminal device, a Uu RRC message destined to the network node and containing an on-demand request for the system information.

In an embodiment, the system information may include one or more SIBs, or one or more information fields of the SIBs, related to the sidelink communication.

According to a third aspect of the present disclosure, a first terminal device is provided. The first terminal device includes: a receiving unit configured to receive, from a second terminal device serving as a relay between the first terminal device and a network node, system information related to sidelink communication between the first terminal device and the second terminal device.

The respective embodiments and features described above in connection with the first aspect also apply to the third aspect.

According to a fourth aspect of the present disclosure, a first terminal device is provided. The first terminal device includes a transceiver, a processor and a memory. The memory contains instructions executable by the processor whereby the first terminal device is operative to: receive, from a second terminal device serving as a relay between the first terminal device and a network node, system information related to sidelink communication between the first terminal device and the second terminal device.

In an embodiment, the memory may further contain instructions executable by the processor whereby the first terminal device is operative to perform the method according to the above first aspect.

According to a fifth aspect of the present disclosure, a computer readable storage medium is provided. The computer readable storage medium has computer program instructions stored thereon. The computer program instructions, when executed by a processor in a first terminal device, cause the first terminal device to: receive, from a second terminal device serving as a relay between the first terminal device and a network node, system information related to sidelink communication between the first terminal device and the second terminal device.

In an embodiment, the computer program instructions, when executed by the processor in the first terminal device, may further cause the first terminal device to perform the method according to the above first aspect.

According to a sixth aspect of the present disclosure, a second terminal device serving as a relay between a first terminal device and a network node is provided. The second terminal device includes: a transmitting unit configured to transmit, to the first terminal device, system information related to sidelink communication between the first terminal device and the second terminal device.

The respective embodiments and features described above in connection with the second aspect also apply to the sixth aspect.

According to a seventh aspect of the present disclosure, second terminal device serving as a relay between a first terminal device and a network node is provided. The second terminal device includes a transceiver, a processor and a memory.

The memory contains instructions executable by the processor whereby the second terminal device is operative to: transmit, to the first terminal device, system information related to sidelink communication between the first terminal device and the second terminal device.

In an embodiment, the memory may further contain instructions executable by the processor whereby the second terminal device is operative to perform the method according to the above second aspect.

According to an eighth aspect of the present disclosure, a computer readable storage medium is provided. The computer readable storage medium has computer program instructions stored thereon. The computer program instructions, when executed by a processor in a second terminal device serving as a relay between a first terminal device and a network node, cause the second terminal device to: transmit, to the first terminal device, system information related to sidelink communication between the first terminal device and the second terminal device.

In an embodiment, the computer program instructions, when executed by the processor in the second terminal device, may further cause the second terminal device to perform the method according to the above second aspect.

According to a ninth aspect of the present disclosure, a method in a network node is provided. The method includes: transmitting, to a first terminal device via a second terminal device, system information related to sidelink communication between the first terminal device and the second terminal device.

In an embodiment, the system information may be transmitted in a Uu RRC message or a container.

In an embodiment, the method may further include: receiving, via the second terminal device, a Uu RRC message originated from the first terminal device and containing an on-demand request for the system information.

In an embodiment, the system information may be transmitted periodically or in response to an update of the system information.

According to a tenth aspect of the present disclosure, a network node is provided. The network node includes: a transmitting unit configured to transmit, to a first terminal device via a second terminal device, system information related to sidelink communication between the first terminal device and the second terminal device.

The respective embodiments and features described above in connection with the ninth aspect also apply to the tenth aspect.

According to an eleventh aspect of the present disclosure, a network node is provided. The network node includes a transceiver, a processor and a memory. The memory contains instructions executable by the processor whereby the network node is operative to: transmit, to a first terminal device via a second terminal device, system information related to sidelink communication between the first terminal device and the second terminal device.

In an embodiment, the memory may further contain instructions executable by the processor whereby the network node is operative to perform the method according to the above ninth aspect.

According to a twelfth aspect of the present disclosure, a computer readable storage medium is provided. The computer readable storage medium has computer program instructions stored thereon. The computer program instructions, when executed by a processor in a network node, cause the network node to: transmit, to a first terminal device via a second terminal device, system information related to sidelink communication between the first terminal device and the second terminal device.

In an embodiment, the computer program instructions, when executed by the processor in the network node, may further cause the network node to perform the method according to the above ninth aspect.

With the embodiments of the present disclosure, a terminal device serving as a relay between another terminal device and a network node can transmit system information related to sidelink communication between the terminal devices to the other terminal device, thereby allowing the other terminal device to acquire the system information.

BRIEF DESCRIPTION OF THE DRAWINGS

The above and other objects, features and advantages will be more apparent from the following description of embodiments with reference to the figures, in which:

FIGS. 14 to 17 are flowcharts illustrating methods implemented in a communication system including a host computer, a base station and a user equipment.

DETAILED DESCRIPTION

Figure 1:
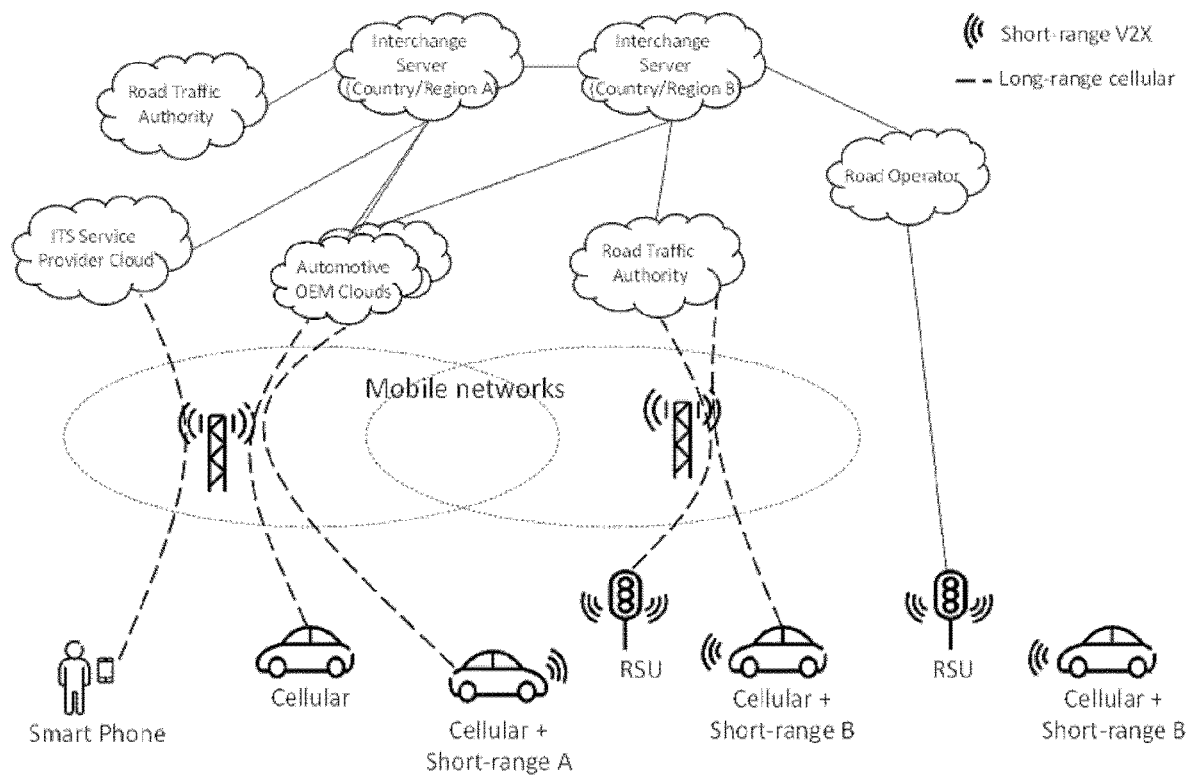
FIG. 1 is a schematic diagram showing an application environment of a C-ITS.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network node in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network node" or "network device" refers to a device in a wireless communication network via which a terminal device accesses the network and receives services therefrom. The network node or network node refers to a base station (BS), an access point (AP), or any other suitable device in the wireless communication network. The BS may be, for example, a node B (NodeB or NB), an evolved NodeB (eNodeB or eNB), or a (next) generation (gNB), a Remote Radio Unit (RRU), a radio header (RH), a remote radio head (RRH), a relay, a low power node such as a femto, a pico, and so forth. Yet further examples of the network node may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network node may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VoIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink transmission refers to a transmission from the network node to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms. The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
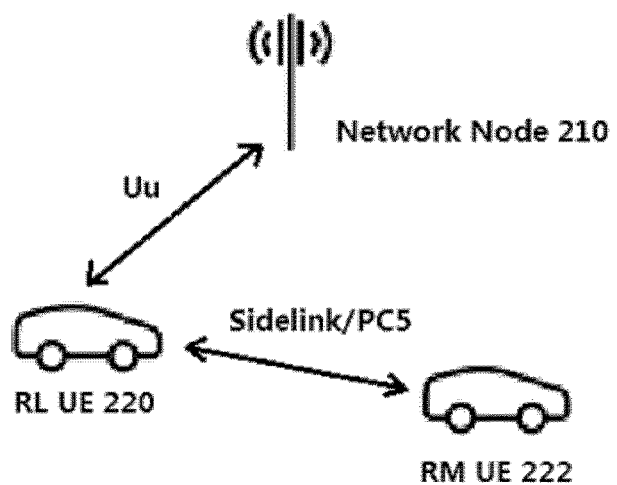
FIG. 2 is a schematic diagram showing an exemplary sidelink relay scenario.
Figure 3:
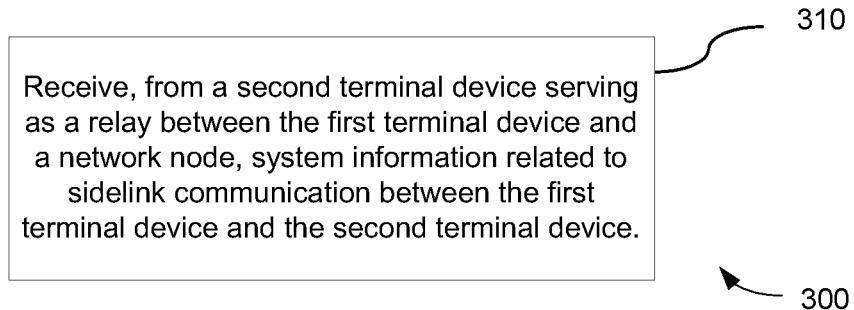
FIG. 3 is a flowchart illustrating a method in a first terminal device according to an embodiment of the present disclosure.

FIG. 3 is a flowchart illustrating a method 300 according to an embodiment of the present disclosure. The method 300 can be performed at a first terminal device (referred to as an RM UE hereinafter), e.g., the RM UE 222 in FIG. 2. The RM UE may intend to establish, or may have established, sidelink (PC5) communication with a second terminal device (referred to as an RL UE hereinafter), e.g., the RL UE 220 in FIG. 2. The RL UE can serve as a relay between the RM UE and a network node, and thus the sidelink (PC5) communication between the RM UE and the RL UE is also referred to as a relay path in this context.

At block 310, system information related to sidelink communication between the RM UE the RL UE and is received from the RL UE.

Here, the system information may include one or more SIBs, or one or more information fields of the SIBs, related to the sidelink communication. As a non-limiting example, the SIBs related to the sidelink communication may include e.g., SIB1, SIB12, SIB13, and SIB14, and the information fields related to the sidelink communication may include e.g., Sidelink Radio Bearer (SLRB) Configuration.

In the block 310, the system information may be received via PC5 dedicated signaling (with or without security activated) or PC5 broadcast signaling, e.g., PC5-S or PC5-RRC signaling.

In an example, the RM UE may transmit a request message to the RL UE and the system information may be received as a response to the request message. Here, the request message may be the request for establishing the sidelink communication (e.g., a UE to Network (NW) Relay Communication Request message). The transmission of the request itself may indicate implicitly to the RL UE that the RM UE requires the system information for establishing the sidelink communication. Alternatively, the request message (e.g., UE to NW Relay Communication Request) may contain an explicit indication (e.g., a flag or an information field) indicating that the RM UE requires the system information for establishing the sidelink communication. In an example, the request message may explicitly indicate the SIB(s) or information field(s) required by the RM UE for establishing the sidelink communication. In an example, the request message may be a new message (e.g., Relay SI/SIB Request) indicating that the RM UE requires the system information for establishing the sidelink communication and optionally containing an indication of which SIB(s) or information field(s) is/are required by the RM UE. The request message can be transmitted to the RL UE via PC5-S signaling.

In another example, the request message may be an on-demand request for the system information. The on-demand request can be included in a PC5 message and indicate the system information (e.g., SIB(s) or information field(s)) required by the RM UE. For example, the on-demand request may be triggered when one or more of the following conditions are met:
  the RM UE does not have the system information required for establishing the sidelink communication,
  the system information stored at the RM UE becomes invalid,
  an update of the system information is available, e.g., when a valueTag in si-SchedulingInfo for a particular SIB indicates that a new version of the SIB is available from the network node,
  the RM UE switches from communication with the network node relayed by a third terminal device (e.g., a previous RL UE) to communication with the network node relayed by the RL UE (i.e., change of RL UE),
  the RM UE switches from direct communication with the network node to communication with the network node relayed by the RL UE (i.e., change from a direct path to a relay path), or
  the RM UE switches from communication with another network node to communication with the network node (i.e., change of network node).

In another example, in the block 310, the system information can be received in a Uu RRC message or a container (e.g., OCTET STRING in Abstract Syntax Notation One (ASN.1)) originated from the network node and forwarded by the RL UE. For example, the Uu RRC message or the container can be transmitted from the network node when the system information changes. Alternatively, the RM UE may transmit, to the RL UE, a Uu RRC message destined to the network node and containing an on-demand request for the system information, and the Uu RRC message or container containing the system information may be received in the block 310 as a response to the on-demand request. Similarly, the on-demand request may be triggered when one or more of the following conditions are met:
  the RM UE does not have the system information required for establishing the sidelink communication,
  the system information stored at the RM UE becomes invalid, an update of the system information is available, e.g., when a valueTag in si-SchedulingInfo for a particular SIB indicates that a new version of the SIB is available from the network node, the RM UE switches from communication with the network node relayed by a third terminal device (e.g., a previous RL UE) to communication with the network node relayed by the RL UE (i.e., change of RL UE), the RM UE switches from direct communication with the network node to communication with the network node relayed by the RL UE (i.e., change from a direct path to a relay path), or the RM UE switches from communication with another network node to communication with the network node (i.e., change of network node).

Figure 4:
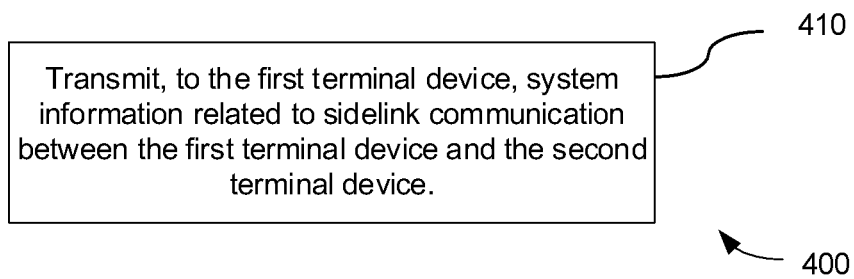
FIG. 4 is a flowchart illustrating a method in a second terminal device according to an embodiment of the present disclosure.

FIG. 4 is a flowchart illustrating a method 400 according to another embodiment of the present disclosure. The method 400 can be performed at a second terminal device (referred to as an RL UE hereinafter), e.g., the RL UE 220 in FIG. 2. The RL UE can serve as a relay between a first terminal device (referred to as an RM UE hereinafter), e.g., the RM UE 222 in FIG. 2, and a network node.

At block 410, system information related to sidelink communication between the RM UE and the RL UE is transmitted to the RM UE.

Here, the system information may include one or more SIBs, or one or more information fields of the SIBs, related to the sidelink communication. As a non-limiting example, the SIBs related to the sidelink communication may include e.g., SIB1, SIB12, SIB13, and SIB14, and the information fields related to the sidelink communication may include e.g., SLRB Configuration.

In the block 410, the system information may be transmitted via PC5 dedicated signaling (with or without security activated) or PC5 broadcast signaling, e.g., PC5-S or PC5-RRC signaling.

In an example, the RL UE may receive a request message from the RM UE and the system information may be transmitted in response to the request message. Here, the request message may be the request for establishing the sidelink communication (e.g., a UE to NW Relay Communication Request message). The transmission of the request itself may indicate implicitly to the RL UE that the RM UE requires the system information for establishing the sidelink communication. Alternatively, the request message (e.g., UE to NW Relay Communication Request) may contain an explicit indication (e.g., a flag or an information field) indicating that the RM UE requires the system information for establishing the sidelink communication. In an example, the request message may explicitly indicate the SIB(s) or information field(s) required by the RM UE for establishing the sidelink communication. In an example, the request message may be a new message (e.g., Relay SI/SIB Request) indicating that the RM UE requires the system information for establishing the sidelink communication and optionally containing an indication of which SIB(s) or information field(s) is/are required by the RM UE. The request message can be received from the RM UE via PC5-S signaling.

In an example, upon receiving the request message, the RL UE may determine whether the requested system information is already locally stored at the RL UE and is currently valid. If so, the RL UE can transmit the system information to the RM UE in the block 410. Otherwise, the RL UE may acquire the system information from the network node, by listening to a broadcast channel for the system information, or transmitting an on-demand request for the system information to the network node and receiving from the network node the system information as a response to the on-demand request (e.g., via dedicated RRC signaling).

In another example, the RL UE may acquire the system information from the network node periodically or in response to an update of the system information. For example, the RL UE may acquire SI/SIB from the network node periodically by listening to a broadcast channel for the system information. In another example, the network node may advertise a change in SI/SIB to the RL UE (e.g., via si-SchedulingInfo), such that the RL UE can acquire the SI/SIB accordingly. If the acquired SI/SIB is related to the RM UE's PC5 and/or Uu operation, the RL UE may transmit the SI/SIB, or information field(s) thereof, to the RM UE in the block 410, with or without request from the RM UE.

In yet another example, in the block 410, the system information may be transmitted in a Uu RRC message or a container (e.g., OCTET STRING in ASN.1) originated from the network node and destined to the RM UE. For example, the Uu RRC message or the container can be transmitted from the network node when the system information changes. Alternatively, the RL UE may receive, from the RM UE, a Uu RRC message destined to the network node and containing an on-demand request for the system information, and can then forward the Uu RRC message to the network node without decoding it. In either case, the RL UE can forward the Uu RRC message or container containing the system information to the RM UE in the block 410 without decoding it. The forwarding of the Uu RRC message can be done at an adaptation layer below the RRC layer at the RL UE. When the system information is included in the container (e.g., OCTET STRING), the RL UE knows that the content in the container is not intended for the RL UE, and simply forwards it to the RM UE, e.g., via PC5 signaling, without decoding the container.

Figure 5:
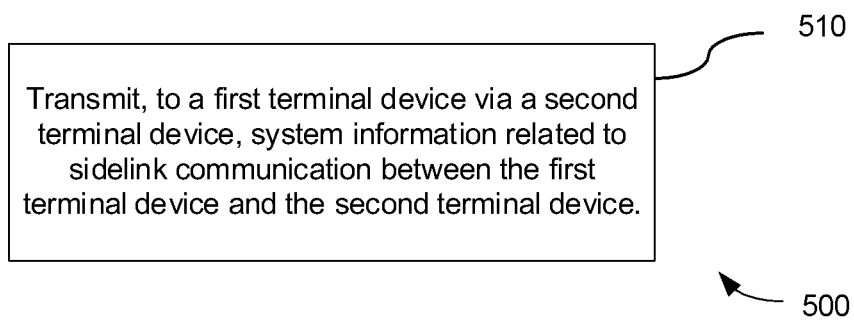
FIG. 5 is a flowchart illustrating a method in a network node according to an embodiment of the present disclosure.

FIG. 5 is a flowchart illustrating a method 500 according to another embodiment of the present disclosure. The method 500 can be performed at a network node, e.g., the network node 210 in FIG. 2. The network node may have a Uu connection with a second terminal device (referred to as an RL UE hereinafter), e.g., the RL UE 220 in FIG. 2. The RL UE can serve as a relay between a first terminal device (referred to as an RM UE hereinafter), e.g., the RM UE 222 in FIG. 2, and the network node.

At block 510, system information related to sidelink communication between the RM UE and the RL UE is transmitted to the RM UE via the RL UE.

Here, the system information may include one or more SIBs, or one or more information fields of the SIBs, related to the sidelink communication. As a non-limiting example, the SIBs related to the sidelink communication may include e.g., SIB1, SIB12, SIB13, and SIB14, and the information fields related to the sidelink communication may include e.g., SLRB Configuration.

In an example, the system information may be transmitted in a Uu RRC message or a container (e.g., OCTET STRING in ASN.1).

In an example, the network node may receive, via the RL UE, a Uu RRC message originated from the RM UE and containing an on-demand request for the system information. Then, the network node can transmit the system information to the RM UE via the RL UE in the block 510 in response to the on-demand request.

Alternatively, the system information may be transmitted periodically or in response to an update of the system information.

Figure 6:
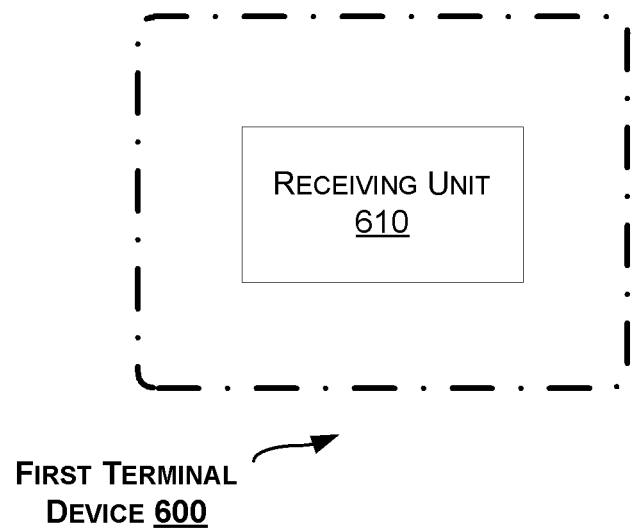
FIG. 6 is a block diagram of a first terminal device according to an embodiment of the present disclosure.

Correspondingly to the method 300 as described above, a first terminal device is provided. FIG. 6 is a block diagram of a first terminal device 600 according to an embodiment of the present disclosure. The first terminal device 600 can be e.g., an RM UE as described above.

The first terminal device 600 can be configured to perform the method 300 as described above in connection with FIG. 3. As shown in FIG. 6, the first terminal device 600 includes a receiving unit 610 configured to receive, from a second terminal device (e.g., an RL UE as described above) serving as a relay between the first terminal device and a network node, system information related to sidelink communication between the first terminal device and the second terminal device.

In an embodiment, the first terminal device 600 may further include a transmitting unit configured to transmit, to the second terminal device, a request message. The system information may be received as a response to the request message.

In an embodiment, the request message may include a request for establishing the sidelink communication.

In an embodiment, the request message may include an indication of the system information required by the first terminal device.

In an embodiment, the request message may include an on-demand request for the system information.

In an embodiment, the system information may be received via PC5-S or PC5-RRC signaling.

In an embodiment, the system information may be received in a Uu RRC message or a container originated from the network node and forwarded by the second terminal device.

In an embodiment, the transmitting unit may be further configured to transmit, to the second terminal device, a Uu RRC message destined to the network node and containing an on-demand request for the system information.

In an embodiment, the on-demand request may be triggered when one or more of the following conditions are met:
the first terminal device does not have the system information required for establishing the sidelink communication,
the system information stored at the first terminal device becomes invalid,
an update of the system information is available,
the first terminal device switches from communication with the network node relayed by a third terminal device to communication with the network node relayed by the second terminal device,
the first terminal device switches from direct communication with the network node to communication with the network node relayed by the second terminal device, or
the first terminal device switches from communication with another network node to communication with the network node.

In an embodiment, the system information may include one or more System Information Blocks, SIBs, or one or more information fields of the SIBs, related to the sidelink communication.

The above unit 610 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 3.

Figure 7:
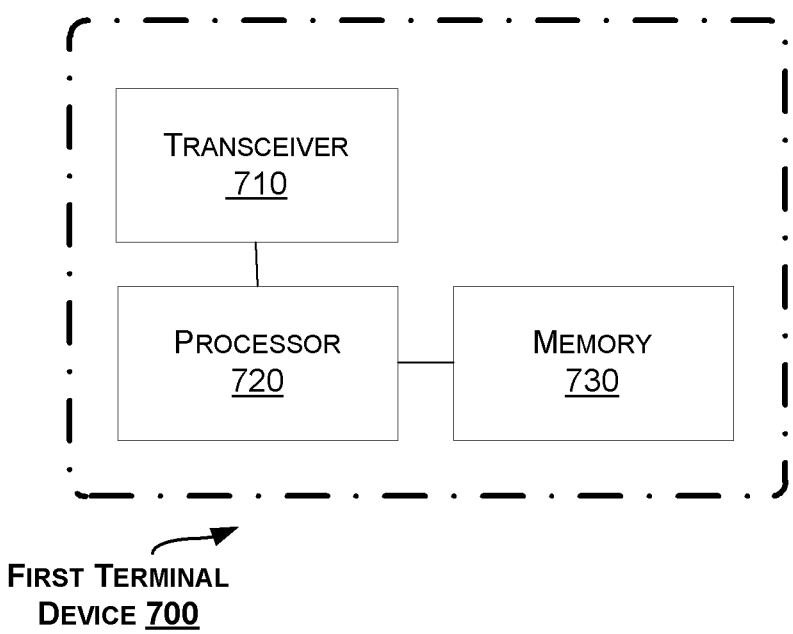
FIG. 7 is a block diagram of a first terminal device according to another embodiment of the present disclosure.

FIG. 7 is a block diagram of a first terminal device 700 according to another embodiment of the present disclosure. The first terminal device 700 can be e.g., an RM UE as described above.

The first terminal device 700 includes a transceiver 710, a processor 720 and a memory 730. The memory 730 contains instructions executable by the processor 720 whereby the first terminal device 700 is operative to perform the actions, e.g., of the procedure described earlier in conjunction with FIG. 3. Particularly, the memory 730 can contain instructions executable by the processor 720 whereby the first terminal device 700 is operative to: receive, from a second terminal device (e.g., an RL UE as described above) serving as a relay between the first terminal device and a network node, system information related to sidelink communication between the first terminal device and the second terminal device.

In an embodiment, the memory 730 can further contain instructions executable by the processor 720 whereby the first terminal device 700 is operative to: transmit, to the second terminal device, a request message. The system information may be received as a response to the request message.

In an embodiment, the request message may include a request for establishing the sidelink communication.

In an embodiment, the request message may contain an indication of the system information required by the first terminal device.

In an embodiment, the request message may include an on-demand request for the system information.

In an embodiment, the system information may be received via PC5-S, or PC5-RRC signaling.

In an embodiment, the system information may be received in a Uu RRC message or a container originated from the network node and forwarded by the second terminal device.

In an embodiment, the memory 730 can further contain instructions executable by the processor 720 whereby the first terminal device 700 is operative to: transmit, to the second terminal device, a Uu RRC message destined to the network node and containing an on-demand request for the system information.

In an embodiment, the on-demand request may be triggered when one or more of the following conditions are met:
the first terminal device does not have the system information required for establishing the sidelink communication,
the system information stored at the first terminal device becomes invalid,
an update of the system information is available,
the first terminal device switches from communication with the network node relayed by a third terminal device to communication with the network node relayed by the second terminal device,
the first terminal device switches from direct communication with the network node to communication with the network node relayed by the second terminal device, or
the first terminal device switches from communication with another network node to communication with the network node.

In an embodiment, the system information may include one or more SIBs, or one or more information fields of the SIBs, related to the sidelink communication.

Figure 8:
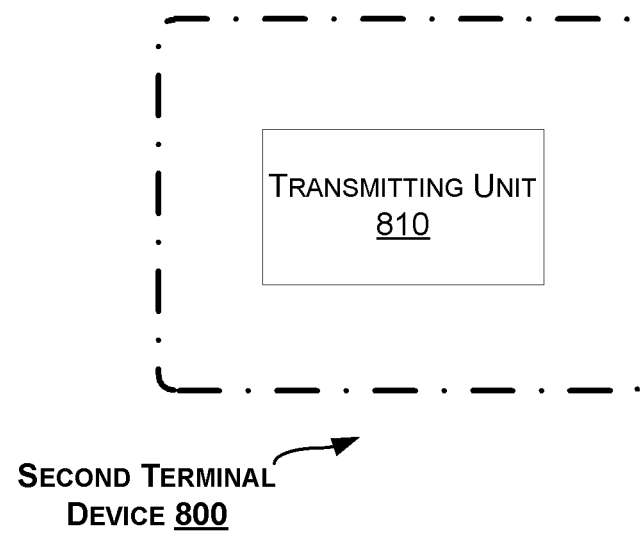
FIG. 8 is a block diagram of a second terminal device according to an embodiment of the present disclosure.

Correspondingly to the method 400 as described above, a second terminal device is provided. FIG. 8 is a block diagram of a second terminal device 800 according to an embodiment of the present disclosure. The second terminal device 800 serves as a relay between a first terminal device and a network node. The second terminal device 800 can be e.g., an RL UE as described above.

The second terminal device 800 can be configured to perform the method 400 as described above in connection with FIG. 4. As shown in FIG. 8, the second terminal device 800 includes a transmitting unit 810 configured to transmit, to the first terminal device, system information related to sidelink communication between the first terminal device and the second terminal device.

In an embodiment, the second terminal device 800 may further include a receiving unit configured to receive, from the first terminal device, a request message. The system information may be transmitted in response to the request message.

In an embodiment, the request message may be a request for establishing the sidelink communication.

In an embodiment, the request message may contain an indication of the system information required by the first terminal device.

In an embodiment, the request message may include an on-demand request for the system information.

In an embodiment, the second terminal device 800 may further include an acquiring unit configured to acquire the system information from the network node when the system information is not locally stored at the second terminal device.

In an embodiment, the acquiring unit may be configured to: listen to a broadcast channel for the system information, or transmit an on-demand request for the system information to the network node and receiving from the network node the system information as a response to the on-demand request.

In an embodiment, the second terminal device 800 may further include an acquiring unit configured to acquire the system information from the network node periodically or in response to an update of the system information.

In an embodiment, the system information may be transmitted via PC5-S or PC5-RRC signaling.

In an embodiment, the system information may be transmitted in a Uu RRC message or a container originated from the network node and destined to the first terminal device.

In an embodiment, the receiving unit may be further configured to receive, from the first terminal device, a Uu RRC message destined to the network node and containing an on-demand request for the system information.

In an embodiment, the system information may include one or more SIBs, or one or more information fields of the SIBs, related to the sidelink communication.

The above unit 810 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 4.

Figure 9:
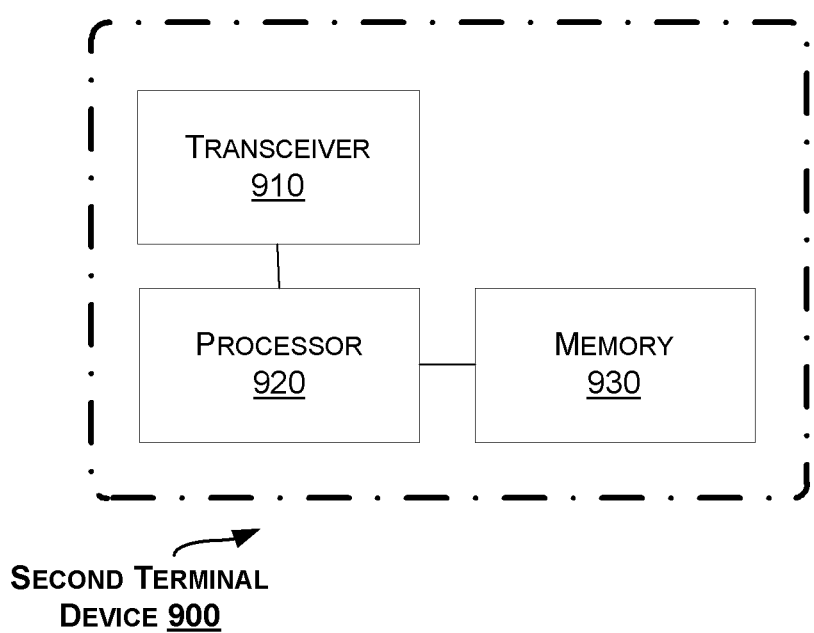
FIG. 9 is a block diagram of a second terminal device according to another embodiment of the present disclosure.

FIG. 9 is a block diagram of a second terminal device 900 according to another embodiment of the present disclosure. The second terminal device 900 serves as a relay between a first terminal device and a network node. The second terminal device 900 can be e.g., an RL UE as described above.

The second terminal device 900 includes a transceiver 910, a processor 920 and a memory 930. The memory 930 contains instructions executable by the processor 920 whereby the second terminal device 900 is operative to perform the actions, e.g., of the procedure described earlier in conjunction with FIG. 4. Particularly, the memory 930 can contain instructions executable by the processor 920 whereby the second terminal device 900 is operative to: transmit, to the first terminal device, system information related to sidelink communication between the first terminal device and the second terminal device.

In an embodiment, the memory 930 can further contain instructions executable by the processor 920 whereby the second terminal device 900 is operative to: receive, from the first terminal device, a request message. The system information may be transmitted in response to the request message.

In an embodiment, the request message may be a request for establishing the sidelink communication.

In an embodiment, the request message may contain an indication of the system information required by the first terminal device.

In an embodiment, the request message may include an on-demand request for the system information.

In an embodiment, the memory 930 can further contain instructions executable by the processor 920 whereby the second terminal device 900 is operative to: acquire the system information from the network node when the system information is not locally stored at the second terminal device.

In an embodiment, the operation of acquiring may include: listening to a broadcast channel for the system information, or transmitting an on-demand request for the system information to the network node and receiving from the network node the system information as a response to the on-demand request.

In an embodiment, the memory 930 can further contain instructions executable by the processor 920 whereby the second terminal device 900 is operative to: acquire the system information from the network node periodically or in response to an update of the system information.

In an embodiment, the system information may be transmitted via PC5-S or PC5-RRC signaling.

In an embodiment, the system information may be transmitted in a Uu RRC message or a container originated from the network node and destined to the first terminal device.

In an embodiment, the memory 930 can further contain instructions executable by the processor 920 whereby the second terminal device 900 is operative to:

receive, from the first terminal device, a Uu RRC message destined to the network node and containing an on-demand request for the system information.

In an embodiment, the system information may include one or more SIBs, or one or more information fields of the SIBs, related to the sidelink communication.

Figure 10:
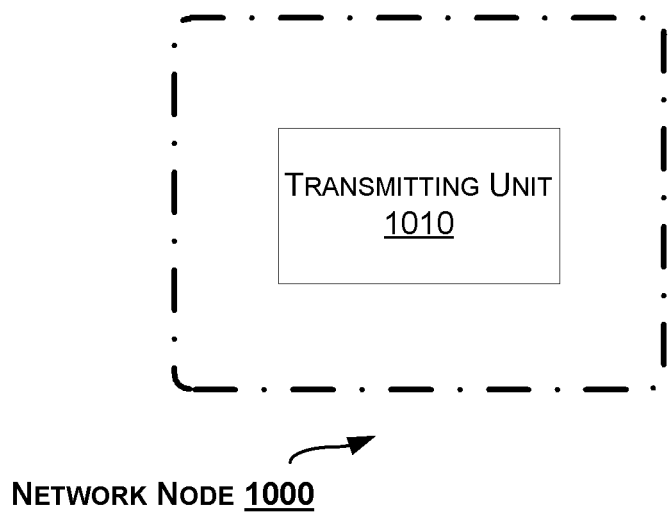
FIG. 10 is a block diagram of a network node according to an embodiment of the present disclosure.

Correspondingly to the method 500 as described above, a network node is provided. FIG. 10 is a block diagram of a network node 1000 according to an embodiment of the present disclosure.

The network node 1000 can be configured to perform the method 500 as described above in connection with FIG. 5. As shown in FIG. 10, the network node 1000 includes a transmitting unit 1010 configured to transmit, to a first terminal device via a second terminal device, system information related to sidelink communication between the first terminal device and the second terminal device.

In an embodiment, the system information may be transmitted in a Uu RRC message or a container.

In an embodiment, the network node 1000 may further include a receiving unit configured to receive, via the second terminal device, a Uu RRC message originated from the first terminal device and containing an on-demand request for the system information.

In an embodiment, the system information may be transmitted periodically or in response to an update of the system information.

The above unit 1010 can be implemented as a pure hardware solution or as a combination of software and hardware, e.g., by one or more of: a processor or a microprocessor and adequate software and memory for storing of the software, a Programmable Logic Device (PLD) or other electronic component(s) or processing circuitry configured to perform the actions described above, and illustrated, e.g., in FIG. 5.

Figure 11:
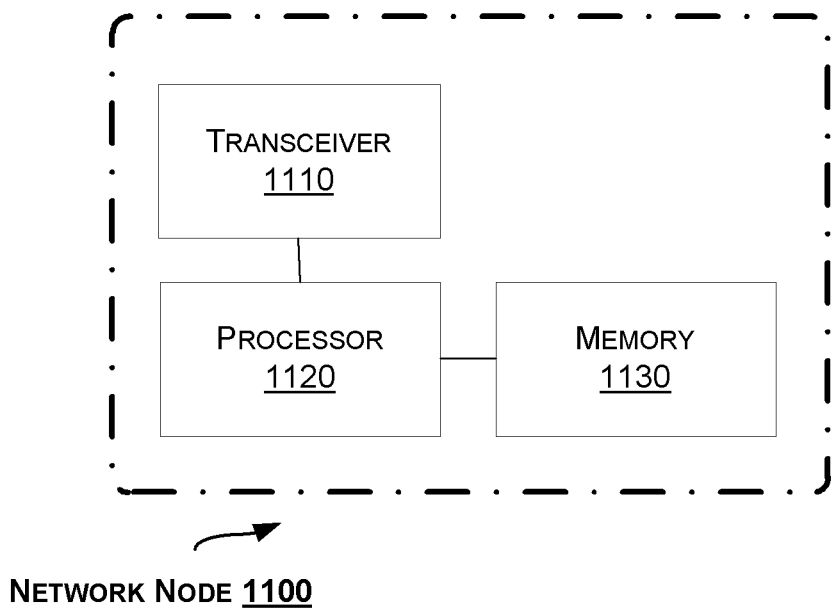
FIG. 11 is a block diagram of a network node according to another embodiment of the present disclosure.

FIG. 11 is a block diagram of a network node 1100 according to another embodiment of the present disclosure.

The network node 1100 includes a transceiver 1110, a processor 1120 and a memory 1130. The memory 1130 contains instructions executable by the processor 1120 whereby the network node 1100 is operative to perform the actions, e.g., of the procedure described earlier in conjunction with FIG. 5.

Particularly, the memory 1130 can contain instructions executable by the processor 1120 whereby the network node 1100 is operative to: transmit, to a first terminal device via a second terminal device, system information related to sidelink communication between the first terminal device and the second terminal device.

In an embodiment, the system information may be transmitted in a Uu RRC message or a container.

In an embodiment, the memory 1130 can further contain instructions executable by the processor 1120 whereby the network node 1100 is operative to: receive, via the second terminal device, a Uu RRC message originated from the first terminal device and containing an on-demand request for the system information.

In an embodiment, the system information may be transmitted periodically or in response to an update of the system information.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes: code/computer readable instructions, which when executed by the processor 720 causes the first terminal device 700 to perform the actions, e.g., of the procedure described earlier in conjunction with FIG. 3, or code/computer readable instructions, which when executed by the processor 920 causes the second terminal device 900 to perform the actions, e.g., of the procedure described earlier in conjunction with FIG. 4, or code/computer readable instructions, which when executed by the processor 1120 causes the network node 1100 to perform the actions, e.g., of the procedure described earlier in conjunction with FIG. 5.

The computer program product may be configured as a computer program code structured in computer program modules. The computer program modules could essentially perform the actions of the flow illustrated in FIG. 3, 4, or 5.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random-Access Memory (RAM), a Read-Only Memory (ROM), or an EEPROM, and the computer program modules described above could in alternative embodiments be distributed on different computer program products in the form of memories.

Figure 12:
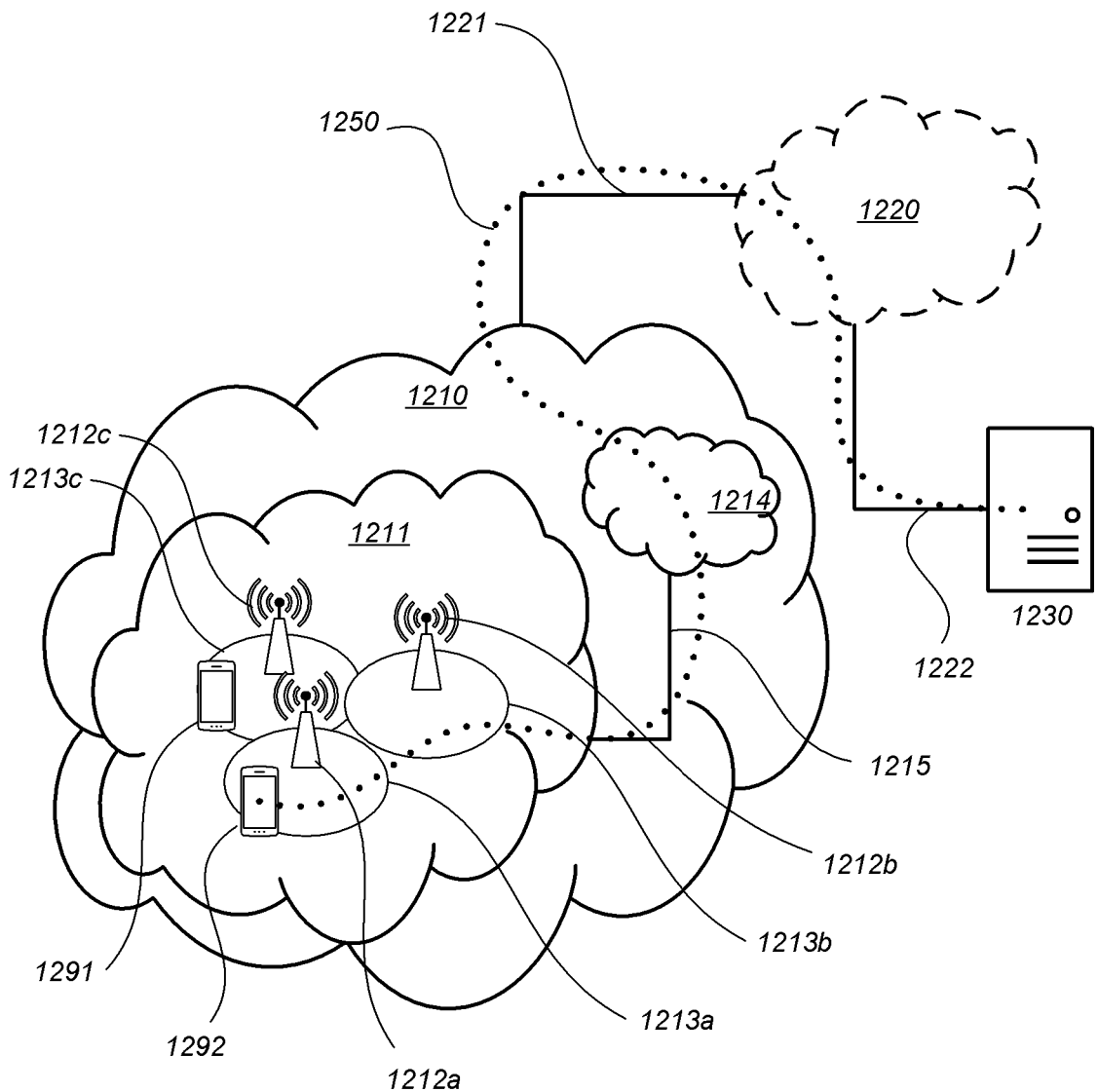
FIG. 12 schematically illustrates a telecommunication network connected via an intermediate network to a host computer.

With reference to FIG. 12, in accordance with an embodiment, a communication system includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first UE 1291 located in a coverage area 1213c is configured to wirelessly connect to, or be paged by, the corresponding base station 1212c. A second UE 1292 in a coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. Connections 1221 and 1222 between the telecommunication network 1210 and the host computer 1230 may extend directly from the core network 1214 to the host computer 1230 or may go via an optional intermediate network 1220. An intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system of FIG. 12 as a whole enables connectivity between the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, the base station 1212 may not or need not be informed about the past routing of an incoming downlink communication with data originating from the host computer 1230 to be forwarded (e.g., handed over) to a connected UE 1291. Similarly, the base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises a processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as UE 1330 connecting via an OTT connection 1350 terminating at the UE 1330 and the host computer 1310. In providing the service to the remote user, the host application 1312 may provide user data which is transmitted using the OTT connection 1350.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with the UE 1330 located in a coverage area (not shown in FIG. 13) served by the base station 1320. The communication interface 1326 may be configured to facilitate a connection 1360 to the host computer 1310. The connection 1360 may be direct or it may pass through a core network (not shown in FIG. 13) of the telecommunication system and/or through one or more intermediate networks outside the telecommunication system. In the embodiment shown, the hardware 1325 of the base station 1320 further includes a processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes a processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
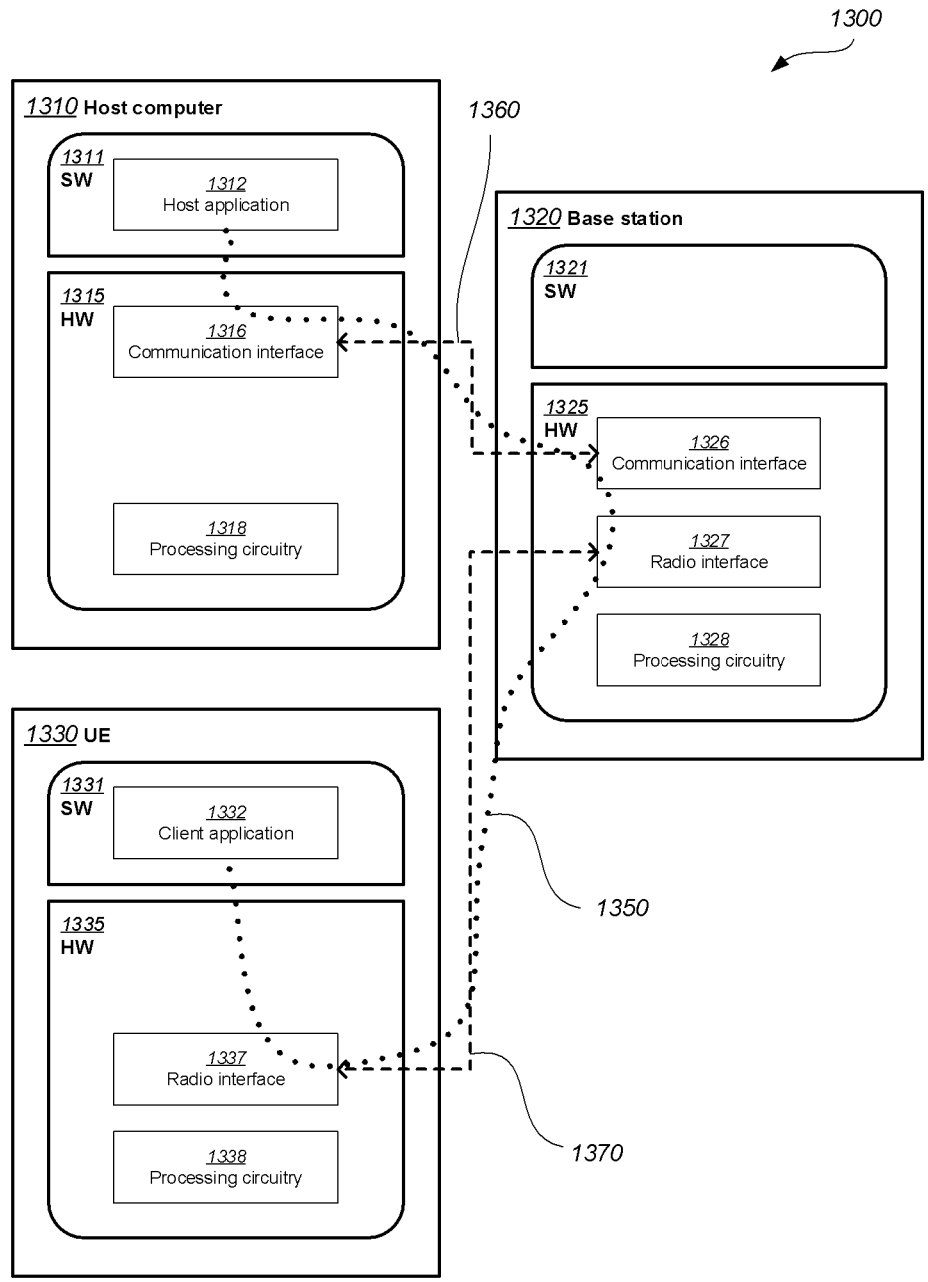
FIG. 13 is a generalized block diagram of a host computer communicating via a base station with a user equipment over a partially wireless connection.

It is noted that the host computer 1310, the base station 1320 and the UE 1330 illustrated in FIG. 13 may be similar or identical to the host computer 1930, one of base stations 1912a, 1912b, 1912c and one of UEs 1991, 1992 of FIG. 12, respectively. This is to say, the inner workings of these entities may be as shown in FIG. 13 and independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

Wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may improve the communication quality and efficiency, and thereby provide benefits such as reduced user waiting time.

A measurement procedure may be provided for the purpose of monitoring data rate, latency and other factors on which the one or more embodiments improve. There may further be an optional network functionality for reconfiguring the OTT connection 1350 between the host computer 1310 and the UE 1330, in response to variations in the measurement results. The measurement procedure and/or the network functionality for reconfiguring the OTT connection 1350 may be implemented in software 1311 and hardware 1315 of the host computer 1310 or in software 1331 and hardware 1335 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which the software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer 1310's measurements of throughput, propagation times, latency and the like. The measurements may be implemented in that the software 1311 and 1331 causes messages to be transmitted, in particular empty or 'dummy' messages, using the OTT connection 1350 while it monitors propagation times, errors etc.

FIG. 14 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

FIG. 15 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 15 will be included in this section. In step 1510 of the method, the host computer provides user data. In an optional substep (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

FIG. 16 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 16 will be included in this section. In step 1610 (which may be optional), the UE receives input data provided by the host computer. Additionally or alternatively, in step 1620, the UE provides user data. In substep 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in substep 1630 (which may be optional), transmission of the user data to the host computer. In step 1640 of the method, the host computer receives the user data transmitted from the UE, in accordance with the teachings of the embodiments described throughout this disclosure.

FIG. 17 is a flowchart illustrating a method implemented in a communication system, in accordance with an embodiment. The communication system includes a host computer, a base station and a UE which may be those described with reference to FIG. 12 and FIG. 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

Hereinafter, the solutions will be further described as follows.

The methods and solutions disclosed in the present disclosure, target to allow the RM UE to be able to acquire the SIBs that are usually broadcasted (or sent via dedicated signaling) by the network. In doing this, three main solutions are proposed:

When establishing a relay connection, the RM UE indicates to the RL UE that a relay path is needed. In such a case:
If the RL UE has already acquired the necessary SIBs:
The RL UE delivers the SIBs to the RM UE either by broadcast or via dedicated signaling. Please, note that the RL UE may deliver the entire SIB as generated by the gNB or just some field in a existing or new PC5-RRC message.
If the RL UE has not acquired the necessary SIBs yet:
The RL UE acquires the SIBs from the gNB via broadcast or via dedicated signaling. This it may implies that the RL UE needs to trigger the on-demand SIB request towards the gNB for acquiring the SIBs.
The RL UE delivers the SIBs to the RM UE either by broadcast or via dedicated signaling. Please, note that the RL UE may deliver the entire SIB as generated by the gNB or just some field in a existing or new PC5-RRC message.
When the relay connectivity between the RM UE and RL UE is already established. In such a case:
Every time the gNB advertises a change for one (or more) SIBs or every time that the RL UE acquires again the SIBs (since the previous ones are not valid anymore)
The updated SIB(s) is sent to the RM UE via the RL UE. This is the case for a L2 solution where the transferring of the messages generated by the gNB is done by the adaptation layer—or something similar—of the RL UE.
The updated SIB(s) is sent by the gNB to the RL UE (via broadcast or via Uu dedicated signaling) and then the RL UE sent the updated SIB to the RM UE via dedicated PC5-RRC signaling. Please, note that the RL UE may deliver the entire SIB as generated by the gNB or just some field in an existing or new PC5-RRC message.
The updated SIB(s) is sent by the gNB to the RL UE (via broadcast or via Uu dedicated signaling) and then the RL UE sent the updated SIB to the RM UE via broadcast by using an unprotected PC5-RRC connection. Please, note that the RL UE may deliver the entire SIB as generated by the gNB or just some field in an existing or new PC5-RRC message.

The updated SIB(s) is sent by the gNB to the RL UE (via broadcast or via Uu dedicated signaling) within a container (i.e., OCTET STRING) and then the RL UE just forward the container to the RM UE via dedicated PC5-RRC signaling w/o decoding the content of the container.

When the relay connectivity between the RM UE and RL UE is already established and the RM UE wants to request a certain SIB(s) or SIB field(s) on-demand. In such a case:
- The RM UE generates a Uu RRC message to gNB to request the SIB (L2 relayed by RL UE), then gNB generates Uu RRC message carrying the on-demand SIB
- The RM UE generates a PC5 RRC message with the requested SIBs (or necessary fields usually contained in the SIBs) and send it to the RL UE, then it is up to RL UE:
  - If RL UE has the SIB (fields) requested, RL UE sends the SIB (field) to RM UE via PC5-RRC
  - If RL UE does not have the SIB (fields) requested, RL UE requests SIB (field) from gNB via Uu RRC
- The RM UE generates PC5 RRC message to RL UE to request the SIB in a container, RL UE forwards the container to gNB without decoding it. After receiving the container, the gNB decodes it and sends the requested SIBs to the RL UE (via broadcast or via Uu dedicated signaling) within a container (i.e., OCTET STRING) and then the RL UE just forward the container to the RM UE via dedicated PC5-RRC signaling w/o decoding the content of the container.

According to the methods and solutions disclosed in the present invention, the RM UE in out-of-coverage conditions will be able to acquire SIB(s) usually provided by the gNB via broadcast or via dedicated signaling.

This will enable the RM UE to properly establish a UE to NW relay path with the RL UE and gNB and to get up-to-date system information when the content of the SIB(s) is changed.

Case1: Delivery of SIB(s) for Establishing a Relay Communication Path

In one embodiment, the RM UE indicates to the RL UE that system information (SI or SIB(s)) are needed to establish a UE to NW relay connectivity. In one of the embodiments, the indication is implicit and is identified by the sending of a UE to NW relay path request (e.g., UE to NW Relay Communication Request message over PC5-S) by the RM UE to the RL UE. Yet, in another embodiment, the indication is explicit and is identified by a flag (or a field) within a message that is send by the RM UE to the RL UE for establishing the UE to NW relay connectivity (e.g., UE to NW Relay Communication Request message over PC5-S). The indication may also explicitly indicate which system information (field(s)) are needed. Alternatively, the indication is sent by a new message (e.g., Relay SI(SIB) Request) sent by the RM UE to the RL UE.

In another embodiment, upon receiving the indication from the RM UE that certain system information is needed, if the required system information for establishing a UE to NW relay communication path are already stored on the RL UE memory and the system information is up to date, the RL UE delivers the system information to the RM UE. In one sub-embodiment, the RL UE delivers the system information to the RM UE via PC5 dedicated signaling (e.g., PC5-S or PC5-RRC). Yet, in another sub-embodiment, the RL UE delivers the system information to the RM UE via PC5 broadcast signaling (e.g., PC5-S or PC5-RRC).

In one embodiment, upon receiving the indication from the RM UE that certain system information are needed, if the required system information for establishing a UE to NW relay communication path are not stored on the RL UE memory (i.e., it means the RL UE did not acquire them yet from the gNB) or the system information is not up to date, the RL UE starts the acquisition of the required system information for establishing a UE to NW relay communication path from the network. In one sub-embodiment, the RL UE acquires the needed system information by listening on the broadcast channel on which the gNB is broadcasting the system information. Yet, in another sub-embodiment, the RL UE triggers an on-demand request to the gNB to indicate that system information for establishing a UE to NW relay communication path are needed.

In another embodiment, when the RL UE sends the needed system information to the RM UE, the RL UE send the system information in the same format as received from the gNB. This means that if the RL UE received SIB1/SIB/SIBx from the gNB, it then delivers the whole SIB1/SIB2/SIBx to the RM UE. Yet, in one embodiment, when the RL UE sends the needed system information to the RM UE, the RL UE sends only the necessary field(s) (e.g. the field(s) related to establishing a UE to NW relay communication path, which is acquired via the SIB(s) received from the gNB) to the RM UE. In one sub-embodiment, the SIB(s) or field(s) are sent in an existing PC5 message (e.g., Relay Communication Response) or can be sent in a new PC5 message dedicated just for the delivering of the system information over PC5 (e.g., Relay System Information).

Case2: Delivery/Update of SIB(s) when a Relay Communication Path is Already Established In one embodiment, every time the gNB advertises a change in the SI/SIB(s) to the RL UEs or every time the RL UE acquires SI/SIB(s) from the gNB (either periodically or due to a change in the SI/SIBs), the RL UE sends the acquired system information to the RM UE. The RL UE may do this only when the SI/SIB(s) contain field(s) that are related to RM UE's PC5 and/or Uu operation and the field(s) are updated.

In one embodiment, the gNB directly send the SI/SIB(s) using Uu RRC signaling to the RM UE that requests the SI/SIB(s). The RL UE forwards that Uu RRC signaling w/o decoding it.

In another embodiment, upon the acquisition (via RRC dedicated signaling or via broadcast) of the SI/SIB (e.g., due to a change in the SI/SIBs, but not limited to), the RL UE sends the acquired SIB(s) to the RM UE over PC5 using PC5 control signaling. In one sub-embodiment, the SIB(s) is sent using dedicated PC5-RRC signaling with security activated, in another sub-embodiment, the SIB(s) is sent via dedicated PC5-RRC with security not activated.

In one embodiment, every time there is a change in the SI/SIBs or change in the field(s) related to RM UE's PC5 and/or Uu operation, the gNB sends the updated SI/SIBs (intended for the RM UE) to the RL UE in a container (i.e., OCTET STRING). Upon receiving this container with the updated SI/SIBs, the RL UE sends this container to the RM UE without decoding it. This means that the container is included in an existing RRC message and the RL UE does not need to decode it as it implicitly understands that what is inside is not intended for him.

In another embodiment, when the RL UE sends the needed system information to the RM UE, the RL UE sends the system information in the same format as received from the gNB. This means that if the RL UE received SIB1/SIB/ SIBx from the gNB, it then delivers the whole SIB1/SIB2/ SIBx to the RM UE. Yet, in one embodiment, when the RL UE sends the needed system information to the RM UE, the RL UE sends only the necessary fields (e.g. fields related to RM UE's PC5 and/or Uu operation, which is acquired via the SIB received from the gNB) to the RM UE. In one sub-embodiment, the SIB or fields are sent in an existing PC5 message (e.g., Relay Communication Response) or can be sent in a new PC5 message dedicated just for the delivering of the system information (e.g., Relay System Information).

Case3: On-Demand SIB(s) Request by RM UE when a Relay Communication Path is Already Established In one embodiment, the RM UE triggers an on-demand request towards the gNB (via the RL UE) to ask one (or more) specific SIB(s) or specific SIB field(s) on-demand. In one embodiment, the triggering for the on-demand SIB(s) request to the gNB (via the RL UE) happens when one or more of the following criteria are met:

Acquisition of SIB(s) needed for establishing a relay communication path (i.e., this means the RM UE did not acquire the requested SIB(s) yet—not in RM UE memory)

The version of the stored SIB(s) is outdated and is not valid anymore

Reception of SIB1 or fields that are usually included within SIB1 (i.e., it depends how the RL UE delivers the SIB1 to the RM UE) by the RM UE.

Change of RL UE (i.e., RM UE switches from RL UE1 to RL UE2)

Change from a direct path to a UE to NW relay path.

Change of gNB

In another embodiment, upon triggering the on-demand SIB(s) request, the RM UE generates a Uu RRC message and uses it to send the on-demand SIB(s) request to the gNB via the RL UE. Yet, in one embodiment, upon triggering the on-demand SIB(s) request, the RM UE generates a PC5 message and uses it to send the on-demand SIB(s) request to the RL UE, which then sends the request to gNB using Uu RRC message. Further, in another embodiment, upon triggering the on-demand SIB(s) request, the RM UE generates a Uu RRC message which includes the SIB(s) request and then generates a PC5 RRC message which includes a container (i.e., OCTET STRING) for the said Uu RRC message, the RM UE then sends the PC5 RRC message to the RL UE and the RL UE could send this container to the gNB without decoding the content that is inside.

In another embodiment, upon receiving the PC5 message including the on-demand SIB(s) request from the RM UE, if the requested SI/SIB(s) are already stored in the RL UE memory and the SI/SIB(s) is up to date, the RL UE sends the requested SIB(s) (or the necessary fields that are within the requested SIB) to the RM UE via PC5-S or PC5-RRC. Otherwise, the RL UE triggers an on-demand SIB(s) request to the gNB for acquiring the needed SI/SIB(s).

In one embodiment, the gNB generates a Uu RRC message with the requested SIB(s) and sends it to the RM UE via the RL UE. Yet, in another embodiment, upon receiving the on-demand SIB(s) request from the RL UE, the gNB decodes it and sends the requested SIBs to the RL UE (via broadcast or via Uu dedicated signaling) within a container (i.e., OCTET STRING) and then the RL UE just forward the container to the RM UE via dedicated PC5 signaling without decoding the content of the container.

In another embodiment, when the RL UE sends the needed system information to the RM UE, the RL UE sends the system information in the same format as received from the gNB. This means that if the RL UE received SIB1/SIB/ SIBx from the gNB, it then delivers the whole SIB1/SIB2/ SIBx to the RM UE. Yet, in one embodiment, when the RL UE sends the needed system information to the RM UE, the RL UE sends only the necessary fields (acquired via the SIB received from the gNB) to the RM UE. In one sub-embodiment, the SIB or fields are sent in an existing PC5 message (e.g., Relay Communication Response) or can be sent in a new PC5 message dedicated just for the delivering of the system information (e.g., Relay System Information).

The invention claimed is:

1. A method in a first terminal device, comprising:
receiving, from a second terminal device serving as a relay between the first terminal device and a network node, system information related to sidelink communication between the first terminal device and the second terminal device; and
transmitting, to the second terminal device, a request message;
wherein the system information is received as a response to the request message; the request message comprises an on-demand request for the system information; and the on-demand request is triggered when one or more of the following conditions are met:
the first terminal device does not have the system information required for establishing the sidelink communication,
the system information stored at the first terminal device becomes invalid, an update of the system information is available,
the first terminal device switches from communication with the network node relayed by a third terminal device to communication with the network node relayed by the second terminal device,
the first terminal device switches from direct communication with the network node to communication with the network node relayed by the second terminal device, or
the first terminal device switches from communication with another network node to communication with the network node.

2. The method of claim 1, wherein the request message comprises a request for establishing the sidelink communication.

3. The method of claim 1, wherein the request message contains an indication of the system information required by the first terminal device.

4. The method of claim 1, wherein the system information is received via PC5-Signaling, PC5-S, or PC5-Radio Resource Control, RRC, signaling.

5. The method of claim 1, wherein the system information is received in a Uu Radio Resource Control, RRC, message or a container originated from the network node and forwarded by the second terminal device.

6. The method of claim 5, further comprising:
transmitting, to the second terminal device, a Uu RRC message destined to the network node and containing an on-demand request for the system information.

7. The method of claim 1, wherein the system information comprises one or more System Information Blocks, SIBs, or one or more information fields of the SIBs, related to the sidelink communication.

8. A method in a second terminal device serving as a relay between a first terminal device and a network node, comprising:

transmitting, to the first terminal device, system information related to sidelink communication between the first terminal device and the second terminal device; and acquiring the system information from the network node when the system information is not locally stored at the second terminal device;

wherein said acquiring comprises:

listening to a broadcast channel for the system information, or transmitting an on-demand request for the system information to the network node and receiving from the network node the system information as a response to the on-demand request.

9. The method of claim 8, further comprising:

receiving, from the first terminal device, a request message, wherein the system information is transmitted in response to the request message.

10. The method of claim 9, wherein the request message is a request for establishing the sidelink communication.

11. The method of claim 9, wherein the request message contains an indication of the system information required by the first terminal device.

12. The method of claim 8, further comprising:

acquiring the system information from the network node periodically or in response to an update of the system information.

13. The method of claim 8, further comprising:

receiving, from the first terminal device, a Uu RRC message destined to the network node and containing an on-demand request for the system information.

14. A method in a network node, comprising:

transmitting, to a first terminal device via a second terminal device, system information related to sidelink communication between the first terminal device and the second terminal device;

wherein the system information is received as a response to a request message; the request message comprises an on-demand request for the system information; and the on-demand request is triggered when one or more of the following conditions are met:

the first terminal device does not have the system information required for establishing the sidelink communication, the system information stored at the first terminal device becomes invalid, an update of the system information is available, the first terminal device switches from communication with the network node relayed by a third terminal device to communication with the network node relayed by the second terminal device, the first terminal device switches from direct communication with the network node to communication with the network node relayed by the second terminal device, or the first terminal device switches from communication with another network node to communication with the network node.

15. The method of claim 14, further comprising:

receiving, via the second terminal device, a Uu RRC message originated from the first terminal device and containing an on-demand request for the system information.

* * * * *